(12) United States Patent
Goto

(10) Patent No.: US 10,133,524 B2
(45) Date of Patent: Nov. 20, 2018

(54) ELECTRONIC APPARATUS, WIRELESS COMMUNICATION DEVICE, AND POWER CONTROL METHOD

(71) Applicant: Hirokazu Goto, Kanagawa (JP)

(72) Inventor: Hirokazu Goto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/630,239

(22) Filed: Jun. 22, 2017

(65) Prior Publication Data
US 2018/0032291 A1 Feb. 1, 2018

(30) Foreign Application Priority Data

Jul. 29, 2016 (JP) .................................. 2016-149904

(51) Int. Cl.
| | |
|---|---|
| *G06F 3/12* | (2006.01) |
| *H04W 4/80* | (2018.01) |
| *H04W 76/10* | (2018.01) |
| *H04W 52/02* | (2009.01) |
| *H04W 68/02* | (2009.01) |

(52) U.S. Cl.
CPC .......... *G06F 3/1221* (2013.01); *G06F 3/1229* (2013.01); *G06F 3/1236* (2013.01); *G06F 3/1292* (2013.01); *H04W 4/80* (2018.02); *H04W 52/0229* (2013.01); *H04W 68/02* (2013.01); *H04W 76/10* (2018.02)

(58) Field of Classification Search
CPC .... G06F 3/1221; G06F 3/1236; G06F 3/1292; G06F 3/1229; H04W 52/0229; H04W 4/008; H04W 76/02; H04W 68/02; H04W 4/80; H04W 76/10

USPC ......................................................... 358/1.15
See application file for complete search history.

(56) References Cited

U.S. PATENT DOCUMENTS

2006/0274368 A1* 12/2006 Imine .................... G06K 15/00
358/1.15
2011/0173473 A1* 7/2011 Cho ....................... G06F 1/3203
713/323

(Continued)

FOREIGN PATENT DOCUMENTS

| JP | 2005267100 A | 9/2005 |
|---|---|---|
| JP | 2014063404 A | 4/2014 |

*Primary Examiner* — Allen H Nguyen
(74) *Attorney, Agent, or Firm* — Harness, Dickey & Pierce, P.L.C.

(57) ABSTRACT

An electronic apparatus includes circuitry and a wireless communication device. The circuitry controls the electronic apparatus to transition between a first power mode in which the electronic apparatus performs predetermined functions, and a second power mode in which the electronic apparatus consumes power less than that of the first power mode. The wireless communication device outputs a notification signal via a short-range wireless communication when the electronic apparatus is in the second power mode, and outputs a return request signal in response to a connection request signal transmitted from an external device that has received the notification signal to establish a short-range wireless communication connection with the external device. The circuitry causes the electronic apparatus to transition from the second power mode to the first power mode when the wireless communication device outputs the return request signal.

18 Claims, 14 Drawing Sheets

(56) References Cited

U.S. PATENT DOCUMENTS

| | | | |
|---|---|---|---|
| 2011/0182597 A1* | 7/2011 | Motoyama | G03G 15/5004 |
| | | | 399/37 |
| 2016/0360345 A1* | 12/2016 | Kim | H04W 76/14 |
| 2017/0111863 A1* | 4/2017 | Kochery | H04W 52/0229 |
| 2017/0277488 A1* | 9/2017 | Komatsubara | G06F 3/1238 |

* cited by examiner

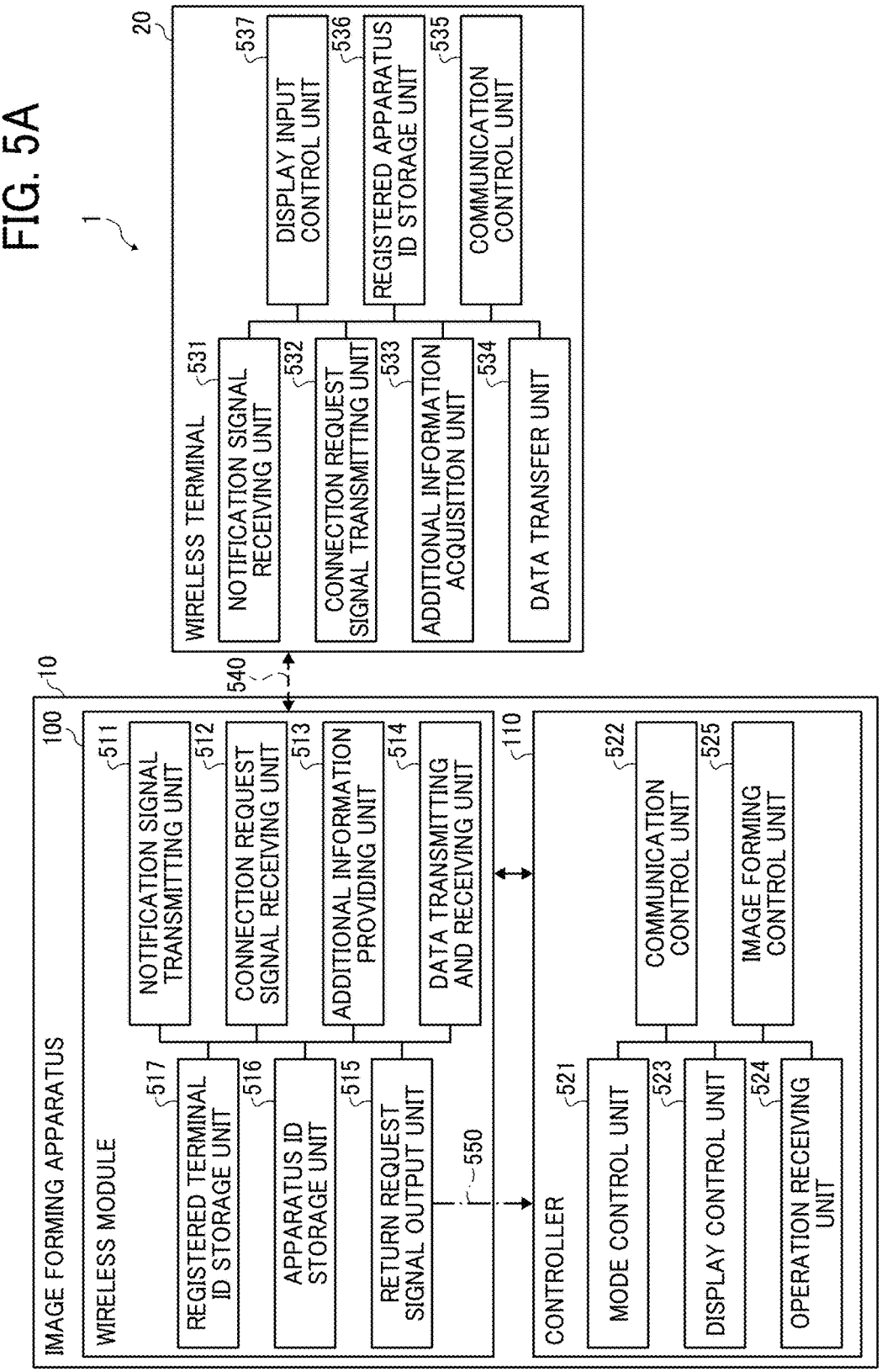

FIG. 5B

| INFORMATION STORED IN APPARATUS ID STORAGE UNIT |
| --- |
| APPARATUS ID 1 |

FIG. 5C

| INFORMATION STORED IN REGISTERED TERMINAL ID STORAGE UNIT |
| --- |
| TERMINAL ID 1 |
| TERMINAL ID 2 |
| TERMINAL ID 3 |
| ⋮ |

FIG. 5D

| INFORMATION STORED IN REGISTERED APPARATUS ID STORAGE UNIT |
| --- |
| APPARATUS ID 1 |
| APPARATUS ID 2 |
| APPARATUS ID 3 |
| ⋮ |

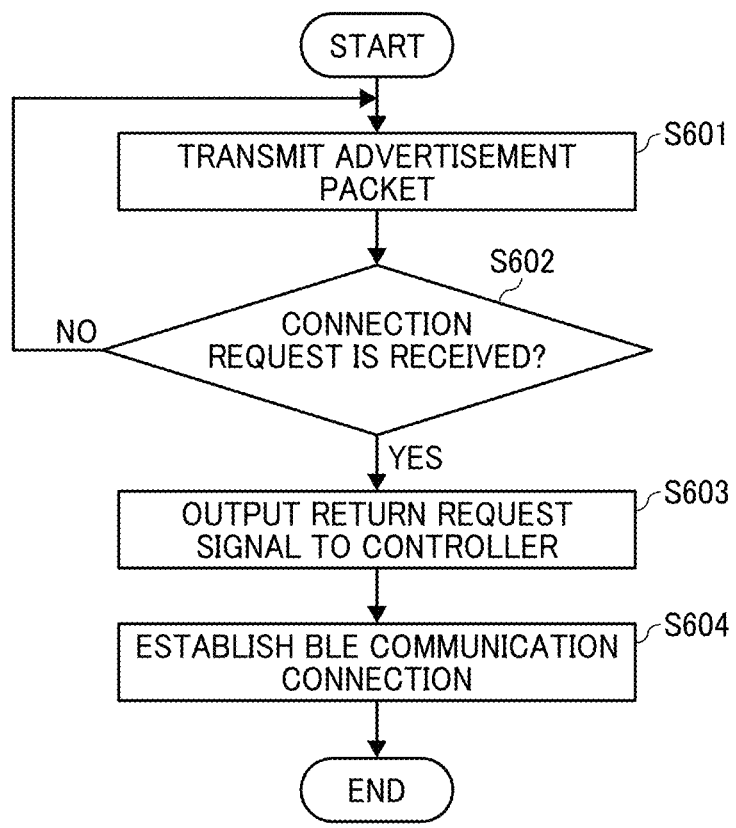

ELECTRONIC APPARATUS, WIRELESS COMMUNICATION DEVICE, AND POWER CONTROL METHOD

CROSS-REFERENCE TO RELATED APPLICATION

This patent application is based on and claims priority pursuant to 35 U.S.C. § 119(a) to Japanese Patent Application No. 2016-149904, filed on Jul. 29, 2016, in the Japan Patent Office, the entire disclosure of which is hereby incorporated by reference herein.

BACKGROUND

Technical Field

Embodiments of the present disclosure relate to an electronic apparatus, a wireless communication device, and a power control method.

Related Art

Image forming apparatuses using Bluetooth (registered trademark) Low Energy (hereinafter referred to as BLE) as a wireless communication technology are known. Additionally, a technique for returning to a normal operating mode from a low-power mode in an image forming apparatus using a wireless local area network (LAN) module as a wireless communications module when the image forming apparatus receives a particular packet from an external device is known.

SUMMARY

An electronic apparatus includes circuitry and a wireless communication device. The circuitry controls the electronic apparatus to transition between a first power mode in which the electronic apparatus performs predetermined functions, and a second power mode in which the electronic apparatus consumes power less than that of the first power mode. The wireless communication device outputs a notification signal via a short-range wireless communication when the electronic apparatus is in the second power mode, and outputs a return request signal in response to a connection request signal transmitted from an external device that has received the notification signal to establish a short-range wireless communication connection with the external device. The circuitry causes the electronic apparatus to transition from the second power mode to the first power mode when the wireless communication device outputs the return request signal.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 5A is a diagram illustrating a functional configuration of the information processing system according to an embodiment;

FIGS. 5B to 5D are illustrations of ID information stored in storage units in the information processing system according to an embodiment;

FIG. 6 is a flowchart illustrating an example process performed by a wireless module according to a first embodiment;

DETAILED DESCRIPTION

Figure 1:
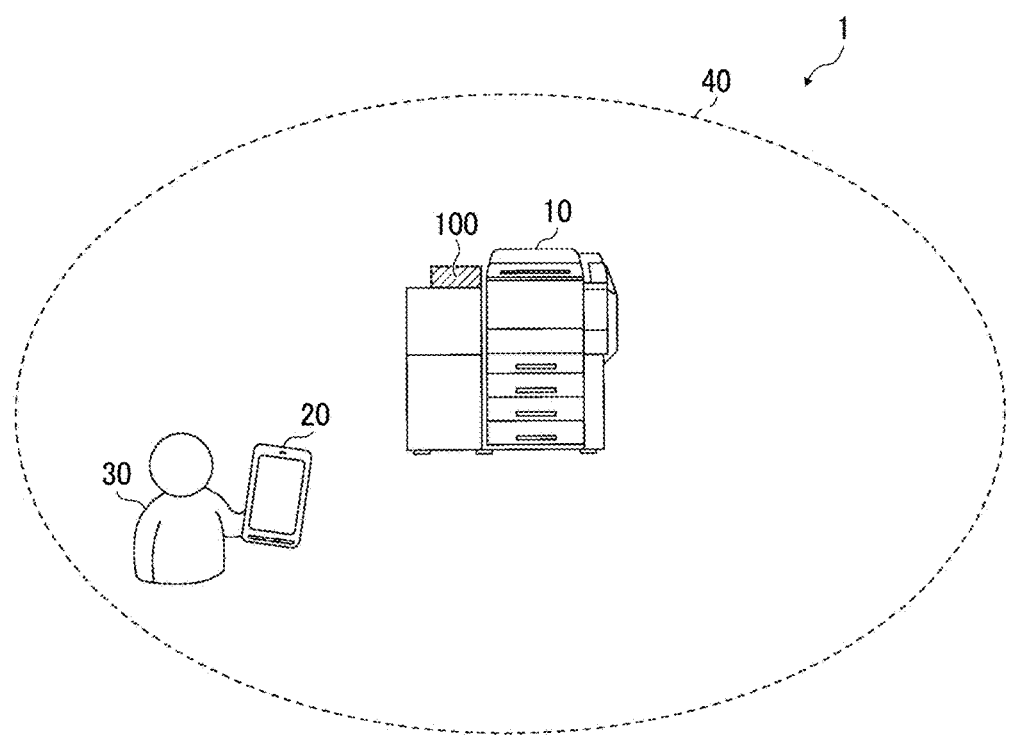
FIG. 1 is illustration of an information processing system according to embodiments of the disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Referring now to the drawings, wherein like reference numerals designate identical or corresponding parts throughout the several views, embodiments of the present disclosure are described below.

System Configuration

FIG. 1 is an illustration of an example of an information processing system 1 according to embodiments of the present disclosure. The information processing system 1 includes an image forming apparatus 10 and a wireless terminal device 20. The image forming apparatus 10 and the wireless terminal device 20 in the information processing system 1 are able to establish a short-range wireless communication.

The image forming apparatus (electronic apparatus) 10 is, for example, a multifunctional peripheral/product (MFP) having a plurality of functions, that is, image forming functions such as a printing function, a scanning function, a copying function, and a facsimile communication function, or an electronic apparatus such as a printer having a printing function.

The image forming apparatus 10 includes a wireless module 100, such as Bluetooth (registered trademark) Low Energy (hereinafter, referred to as BLE), that establishes short-range wireless communication. The image forming apparatus 10 serves as a peripheral in the BLE communication and is able to communicate with a central (e.g., wireless terminal) device 20 that is within an effective wireless communication range 40 where wireless communication can be established (for example, within a 50-meter radius).

The wireless terminal device 20 is an information terminal device, such as a smart phone, a tablet terminal, a notebook personal computer (PC), or the like used by a user 30. Alternatively, the wireless terminal device 20 may be a wearable terminal device such as a smart watch.

The wireless terminal device 20 has the same communication system as the image forming apparatus 10 does, for example, the terminal device 20 has a short-range communication function such as BLE. For example, the wireless terminal device 20 can be the central device in the BLE to establish BLE communication with the image forming apparatus 10.

BLE is one of several extended specifications of Bluetooth, which is a short-range (i.e., personal) wireless communication technology using the Bluetooth 4.0 standard. BLE can provide short-range wireless communication with reduced power consumption compared to standard Bluetooth communication.

BLE supports a communication method called advertising, with which the peripheral (e.g., the image forming apparatus 10) sends an advertisement packet at predetermined intervals to allow the centrals present around the peripheral to obtain device information on the peripheral. The central (e.g. wireless terminal device 20) receives the advertisement packet sent from the peripheral to obtain the information on the peripheral being around the central.

In the above-described configuration, the image forming apparatus 10 has a power-saving function with which the image forming apparatus 10 can transition to a low-power mode (second power mode) from a normal operating mode (first power mode), with which image forming processing can be performed, when the image forming apparatus 10 is not used for a certain preset length of time. The image forming apparatus 10 in the low-power mode consumes less power than in the normal operating mode. The image forming apparatus 10 in the low-power mode can stop operation of, for example, an operation device 114, an engine device 130, a scanner device 120, and a hard disk drive (HDD) 116, which are described later, to reduce power consumption of the image forming apparatus 10.

The wireless module 100 transmits, for example, the advertisement packet for BLE communication within the effective wireless communication range 40 when the image forming apparatus 10 is in the low-power mode, which is the second power mode, in which the image forming apparatus 10 consumes less power than in the normal operating mode, which is the first power mode.

When receiving a connection request signal, which is to connect BLE communication, transmitted from the wireless terminal device 20 that receives the advertisement packet, the wireless module 100 outputs a return request signal to return the image forming apparatus 10 to the normal operating mode from the low-power mode.

The image forming apparatus 10 transitions from the low-power mode (second power mode) to the normal operating mode (first power mode) when the wireless module 100 outputs the return request signal (e.g. a hardware signal in a predetermined pattern).

As described above, the electronic apparatus according to this embodiment, which returns to the normal operating mode from the low-power mode using the wireless module 100, can return to the normal operating mode without depending on a particular packet, application, or the like.

The illustration of FIG. 1 is one example of the configuration of the information processing system 1. For example, the image forming apparatus 10 may be another electronic apparatus, such as a video conference device, an attendance management device, an automatic teller machine (ATM), or a digital signage system, having the power-saving function.

Hardware Configuration

Hardware Configuration of Image Forming Apparatus

Figure 2:
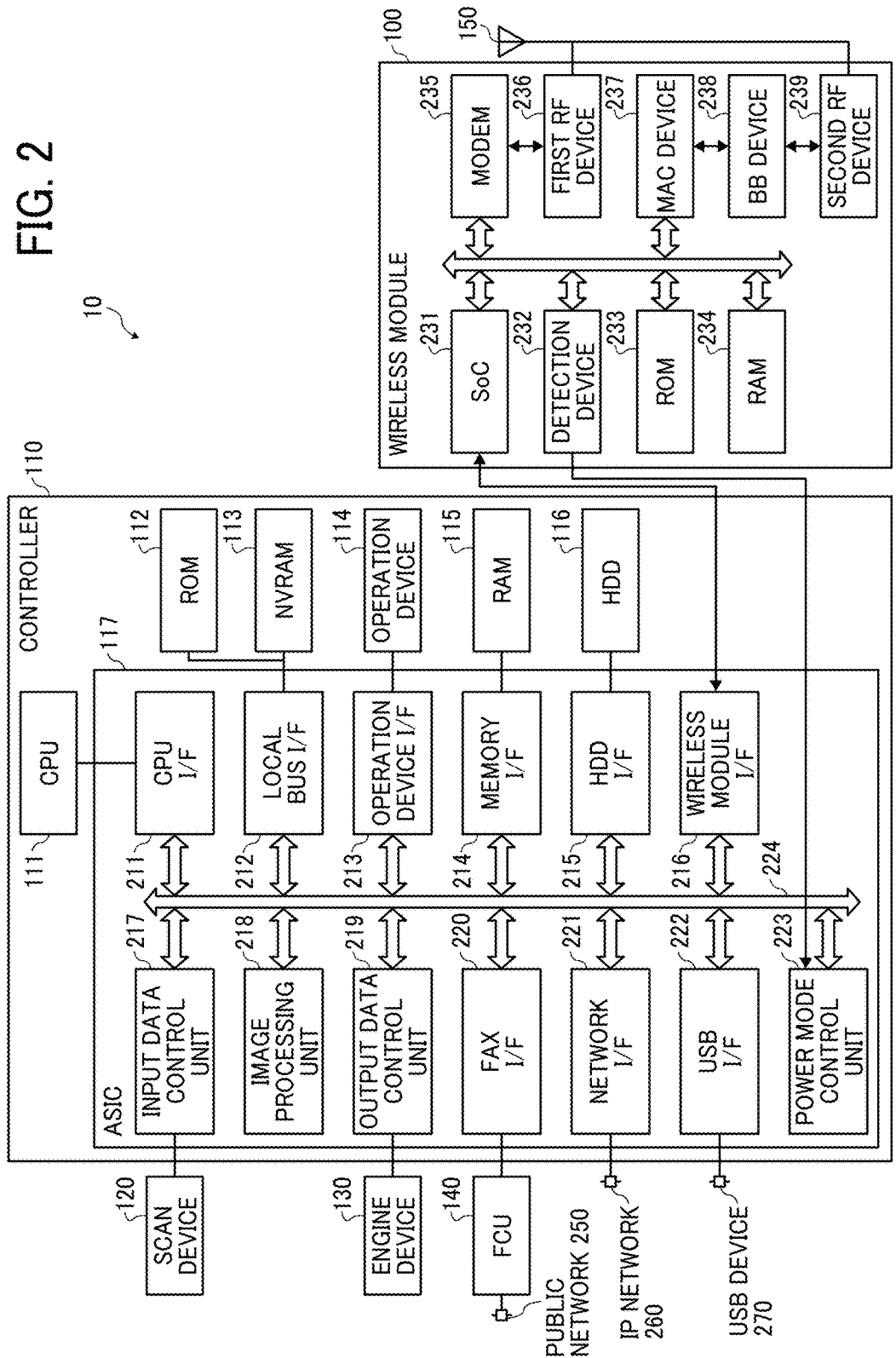
FIG. 2 is a diagram illustrating an example of a hardware configuration of an image forming apparatus according to an embodiment of the disclosure.

FIG. 2 is a diagram illustrating an example of a hardware configuration of an image forming apparatus 10 according to the embodiment.

The image forming apparatus 10 is comprised of the wireless module 100, a controller 110, the scanner device 120, the engine device 130, and a facsimile control unit (hereinafter, referred to as an FCU) 140.

The wireless module 100 is a wireless communication device that supports a communication standard including the above-mentioned BLE and a wireless local area network (LAN). A detailed description of the configuration of the wireless module 100 is deferred.

The controller 110 includes a central processing unit (CPU) 111, a read only memory (ROM) 112, a non-volatile random access memory (NVRAM) 113, the operation device 114, a random access memory (RAM) 115, the HDD 116, and an application-specific integrated circuit (ASIC) 117.

The CPU 111 reads a program, data, and configuration information from the ROM 112, the NVRAM 113, and the HDD 116 to the RAM 115, and executes processing to control the image forming apparatus 10 and implement each function of the image forming apparatus 10.

The ROM 112 is a non-volatile storage device that stores various programs and data. The NVRAM 113 is a writable non-volatile storage device that stores, for example, the configuration information.

The operation device (control panel) 114 includes an input unit to receive user input for operation and a display unit to display an operation screen, for example. Preferably, the operation device 114 has the configuration of a general-purpose computer.

The RAM 115 is a volatile storage device that temporarily stores programs and data. The HDD 116 is a large capacity storage device that stores various programs and data.

The ASIC 117 is an integrated circuit that includes various interfaces and image processing circuits of the image forming apparatus 10 to perform various types of image processing according to instructions from the CPU 111. A detailed description of the configuration of the ASIC 117 is deferred.

The scanner device 120 is a reading device or scanner that scans a document. The engine device 130 is a printer device that prints out print data. The FCU 140 transmits and receives facsimile data.

Example Configuration of Wireless Module

Referring to FIG. 2, the wireless module 100 can be seen to include, for example, a system-on-chip (SoC) 231, a detection device 232, the ROM 233, the RAM 234, a modem 235, a first radio frequency (RF) device 236, a media access control (MAC) device 237, a base band (BB) device 238, a second RF device 239, and an antenna 150.

The SoC 231 is an integral circuit that has a general computer configuration and processes a wireless packet for the BLE communication and wireless LAN communication.

The SoC 231, for example, transmits the advertisement packet for the BLE communication and receives the connection request signal when the image forming apparatus 10 is in the low-power mode. The SoC 231 also outputs a return signal to activate the CPU 111 when receiving the connection request signal from an external device such as the wireless terminal device 20 that receives the advertisement packet.

The detection device 232 determines whether a received signal is the connection request for the BLE communication, and outputs an activation signal to a power mode control unit 223 of the ASIC 117 if the received signal is the connection request for the BLE communication.

The ROM 233 is configured with, for example, a writable non-volatile memory, such as a flash ROM, and stores programs such as a program that controls the wireless module 100.

The RAM 234 is a volatile memory that is used as a work area for executing the program.

The modem 235 controls the BLE communication protocol.

The first RF device 236 up-converts BLE transmission data to wireless frequency and down-converts a received signal in the BLE communication received with the antenna 150 to baseband frequency.

The MAC device 237 controls wireless LAN communication media accesses, executing carrier sense multiple access/collision avoidance (CSMA/CA).

The BB device 238 modulates transmission data and demodulates received data in the wireless LAN communication.

The second RF device 239 up-converts the transmission data in the wireless LAN communication into the wireless frequency and down-converts a received signal in the LAN communication received with the antenna 150 into the baseband frequency.

Configuration of ASIC

As illustrated in FIG. 2, the ASIC 117 includes, for example, a CPU interface (I/F) 211, a local bus I/F 212, an operation device I/F 213, a memory I/F 214, an HDD I/F 215, a wireless module I/F 216, an input data control unit 217, an image processing unit 218, an output data control unit 219, a FAX I/F 220, a network I/F 221, a universal serial bus (USB) I/F 222, the power mode control unit 223, and a system bus 224.

The CPU I/F 211 transfers data to the CPU 111.

The local bus I/F 212 transfers data to the system bus 224 and generates a signal to access the ROM 112 and the NVRAM 113, for example.

The operation device I/F 213 transfers data to the operation device 114.

The memory I/F 214 transfers data to the RAM 115, and generates a control signal such as a double-data-rate synchronous dynamic RAM (DDR-SDRAM).

The HDD I/F 215 writes data from RAM 115 to the HDD 116 and reads data from HDD 116 to the RAM 115.

The wireless module I/F 216 transfers data to the wireless module 100.

The input data control unit 217 controls the scanner device 120 and stores input data input from the scanner device 120 in the RAM 115 via the memory I/F 214.

The image processing unit 218 performs image processing on an input image acquired with the input data control unit 217, for example shading correction, dot correction, gamma correction, color space conversion, and magnification correction, and stores the processed image in the RAM 115 through the memory I/F 214.

The output data control unit 219 reads the print data from the RAM 115 via the memory I/F 214 and outputs the print data to the engine device 130.

The FAX I/F 220 controls data transmission to and from the FCU 140.

The network I/F 221 establishes communication with an external device via an IP network 260 such as the Internet and the LAN.

The USB I/F 222 transfers data to a USB device 270.

The power mode control unit 223 receives the return signal transmitted from the modules and various sensors. As an interface used to transmit the return signal, a general-purpose input output (GPIO) that is operable at low power is often used. Each of the modules and the sensors transmits the return signal using an output port, and a power-saving control unit receives the return signal using an input port. The power mode control unit 223 sequentially operates to return a mode from a low-power consumption mode to a normal operating mode by managing the return signals transmitted from each of the modules and the sensors.

For example, the power mode control unit 223 sequentially operates to return the image forming apparatus 10 from the low-power mode to the normal operating mode when receiving the return signal transmitted from the wireless module 100 via the wireless module OF 216. As one example, the power mode control unit 223 starts power supply to each device, cancels a self refresh mode of the memory I/F 214 to activate the RAM 115, and cancels a sleep mode of the CPU 111 using the CPU I/F 211.

Another Example

Figure 3:
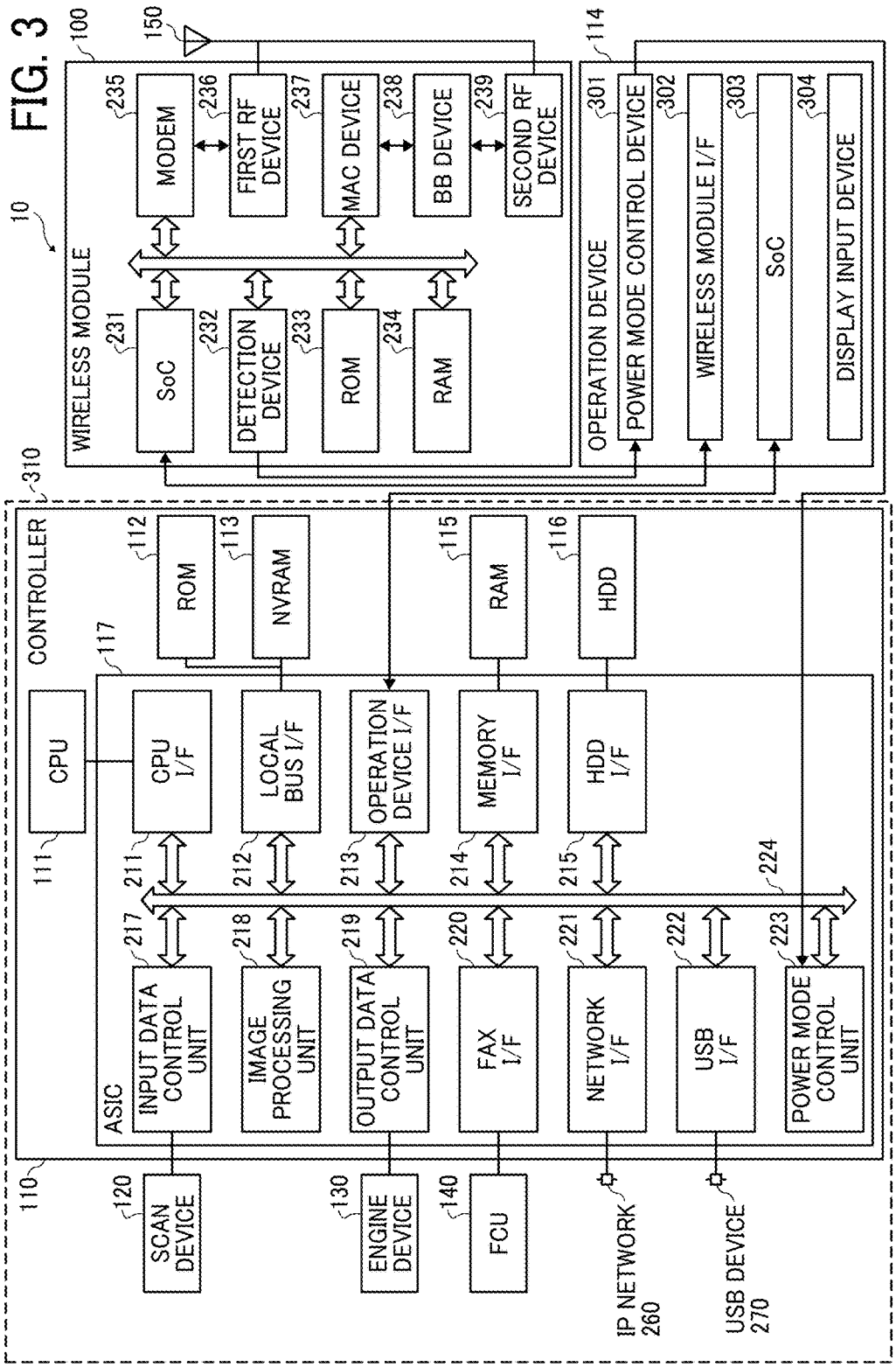
FIG. 3 is a diagram illustrating another example of the hardware configuration of the image forming apparatus according to an embodiment.

FIG. 3 is another example of a hardware configuration of the image forming apparatus 10 according to the embodiments. As illustrated in FIG. 3, the image forming apparatus 10 may include a main body 310 that includes the controller 110 and performs image forming processing, and the operation device 114 that is connected to the main body 310 and receives operation instruction from a user.

In this case, the wireless module 100 may be connected to the operation device 114 instead of the controller 110. The wireless module 100 may be connected to the controller 110 included in the main body 310.

The hardware configuration of the image forming apparatus 10 illustrated in FIG. 3 is basically similar to the hardware configuration of the image forming apparatus 10 illustrated in FIG. 2, and therefore the following description concerns differences between the two hardware configurations.

Referring to FIG. 3, the operation device 114 includes a power mode control device 301, a wireless module I/F 302, a SoC 303, and a display input device 304.

The power mode control device 301 receives a return signal transmitted form the wireless module 100. The power mode control device 301 sequentially operates to return the operation device 114 from a low-power mode to a normal operating mode when receiving the return signal from the wireless module 100.

The power mode control device 301 can output the return signal to the power mode control unit 223 of the controller 110, if necessary, to request to make the image forming apparatus 10 to return to the normal operating mode.

The wireless module I/F 302 transfers data to the wireless module 100.

The SoC 303 is an integrated circuit including a general computer configuration, and, for example, causes the display input device 304 to display an operation screen and receive operation from a user.

The display input device 304 is, for example, a touch panel display.

Hardware Configuration of Wireless Terminal

Figure 4:
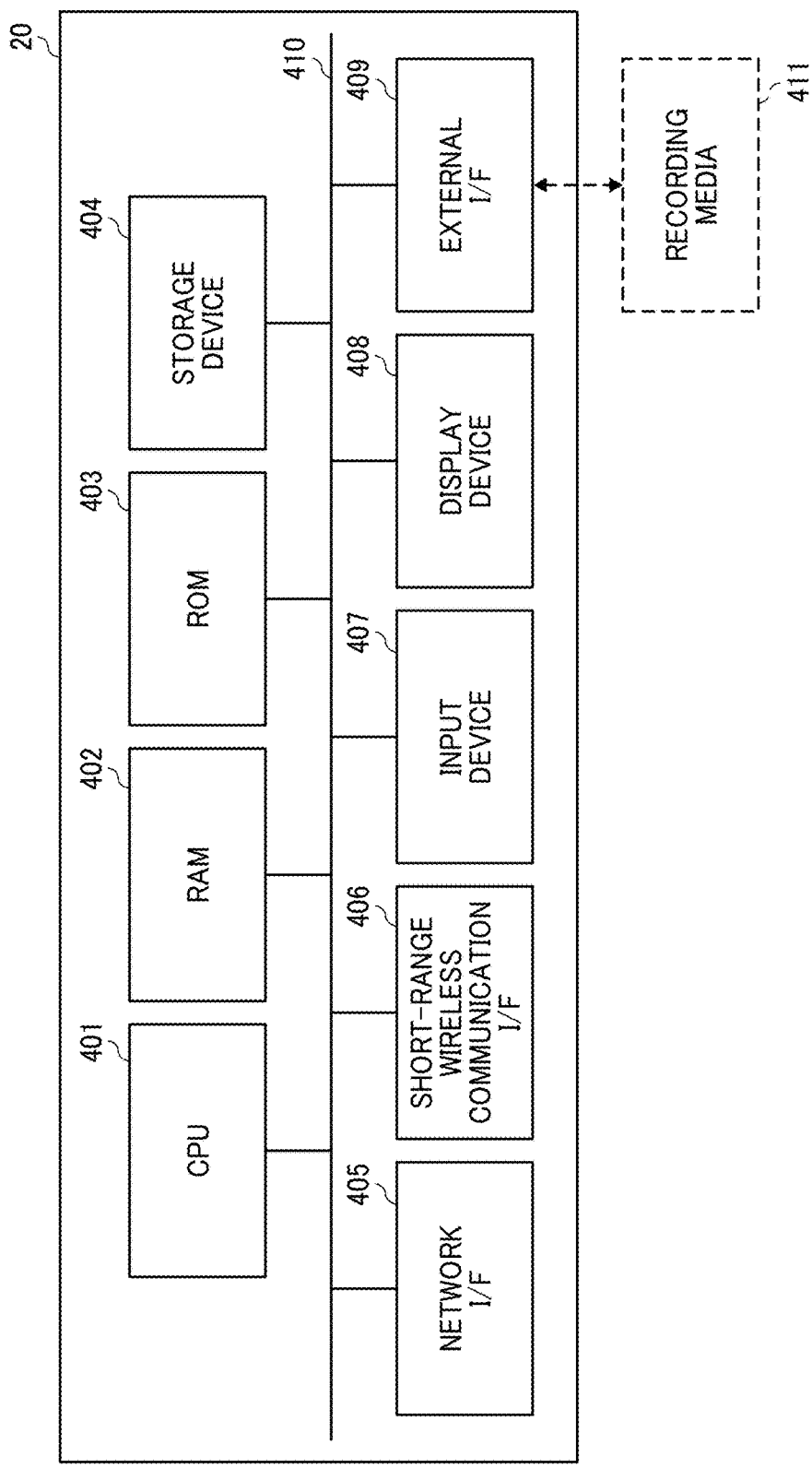
FIG. 4 is a diagram illustrating a hardware configuration of a wireless terminal according to an embodiment of the disclosure.

FIG. 4 is a diagram illustrating an example of a hardware configuration of the wireless terminal device 20 according to the embodiments. The wireless terminal device 20 includes, for example, a CPU 401, a RAM 402, a ROM 403 a storage device 404, a network OF 405, a short-range wireless communication I/F 406, an input device 407, a display device 408, an external I/F 409, and a bus 410.

The CPU 401 reads programs and data stored in, for example, the ROM 403 and the storage device 404 to the RAM 402, and executes processing to implement one or more functions of the wireless terminal device 20. The RAM 402 is a volatile memory to be used as a work area for the CPU 401. The ROM 403 is a non-volatile memory that can holds the programs and the data even after having been turned off and back on.

The storage device 404 is a mass storage device such as an HDD and a Solid State Drive (SSD), and stores, for example, an operating system (OS), an application program and various types of data. The network I/F 405 is an interface to connect the wireless terminal device 20 to a network, such as a wireless local area network (LAN).

The short-range wireless communication I/F 406 is an interface to communicate with the image forming apparatus 10 using, for example, short-range wireless communication such as BLE.

The input device 407 includes a touch panel and a key board that are used to input an operation signal to the wireless terminal device 20. The display device 408 displays, for example, results of processing performed by the wireless terminal device 20.

The input device 407 and the display device 408 may be integrated into a single unit as a display input device, such as a touch panel display screen.

The external I/F 409 is an interface with an external device. The external device includes, for example, a recording medium 411. The bus 410 is connected to each of the above-mentioned components and transfers an address signal, a data signal and various types of control signals.

Functional Configuration

FIG. 5A is a diagram illustrating a functional configuration of the information processing system according to one of the embodiments. FIG. 5B and FIG. 5C are illustrations of examples of ID information stored in storage units of the wireless module 100. FIG. 5D is an illustration of an example of ID information stored in a storage unit of the wireless terminal device 20.

Functional Configuration of Image Forming Apparatus

As illustrated in FIG. 5A, the image forming apparatus (electronic apparatus) 10 includes, for example, the wireless module (wireless communication unit) 100 and the controller (control unit) 110.

The wireless module 100 transmits the advertisement packet (predetermined notification signal) via the BLE communication 540 (short-range wireless communication) when the image forming apparatus 10 is in the low-power mode. The wireless module 100 also outputs a return request signal 550 to the controller 110 when receiving a connection request signal to establish a BLE communication connection from the wireless terminal device (external device) 20 that sends the connection request signal after receiving the advertisement packet.

The wireless module 100 includes a notification signal transmitting unit 511, a connection request signal receiving unit 512, an additional information providing unit 513, a data transmitting and receiving unit 514, a return request signal output unit 515, an apparatus ID storage unit 516, and a registered terminal ID storage unit 517.

The notification signal transmitting unit 511 transmits the advertisement packet, which is a predetermined notification signal, to notify the wireless terminal device 20 of an own presence (presence of the image forming apparatus 10 or the wireless module 100) via the BLE communication, when the image forming apparatus 10 is in the low-power mode (second power mode). The notification signal transmitting unit 511 may be implemented with the SoC 231 illustrated in FIG. 2 and FIG. 3, or by executing a program using the SoC 231 illustrated in FIG. 2 and FIG. 3.

The connection request signal receiving unit 512 receives a connection request (CONNECT_REQ), which is the connection request signal to request the BLE communication, from the wireless terminal device 20 that sends the connection request signal in response to the reception of the advertisement packet transmitted from the notification signal transmitting unit 511. The connection request signal receiving unit 512 may be implemented with the SoC 231 illustrated in FIG. 2 and FIG. 3, or by executing a program using the SoC 231 illustrated in FIG. 2 and FIG. 3.

The additional information providing unit 513 receives a scan request (SCAN_REQ) that is a request signal to request for additional information on the BLE communication from the wireless terminal device 20 that sends the request signal in response to the reception of the advertisement packet transmitted from the notification signal transmitting unit 511. The additional information providing unit 513 sends a scan response (SCAN_RSP) including the additional information on the BLE communication (e.g. information elements that are not included in the advertisement packet) to a request source of the scan request. The additional information providing unit 513 may be implemented with the SoC 231 illustrated in FIG. 2 and FIG. 3, or by executing a program using the SoC 231 illustrated in FIG. 2 and FIG. 3.

The data transmitting and receiving unit 514 establishes the BLE communication connection with the wireless terminal device 20 under control of the communication control unit 522 of the controller 110 to transmit and receive data. The data transmitting and receiving unit 514 may be implemented with the SoC 231 illustrated in FIG. 2 and FIG. 3, or by executing a program using the SoC 231 illustrated in FIG. 2 and FIG. 3.

The return request signal output unit 515 outputs the return request signal to the controller 110 to return to the normal operating mode, when the connection request signal receiving unit 512 receives the predetermined connection request (CONNECT_REQ) from the wireless terminal device 20. The return request signal output unit 515 may be implemented with the detection device 232 included in the wireless module 100 illustrated in FIG. 2. Alternatively, the return request signal output unit 515 may be implemented by executing a program using the SoC 231.

Preferably, the return request signal output unit 515 receives the connection request from the wireless terminal device 20, and, when the connection request includes the terminal ID that is also stored in the registered terminal ID storage unit 517 in advance, outputs the return request signal to the controller 110 to return to the normal operating mode.

The apparatus ID storage unit (second storage unit) 516 stores an apparatus ID (second identification information) in advance as illustrated in FIG. 5B. The apparatus ID is identification information to identify the image forming apparatus 10. The apparatus ID storage unit 516 may be implemented with the ROM 233 included in the wireless module 100 illustrated in FIG. 2, or by executing a program using the SoC 231.

The registered terminal ID storage unit (first storage unit) 517 stores a terminal ID (first identification information) of the wireless terminal device 20 registered in advance, as illustrated in FIG. 5C. The terminal ID is identification information to identify the wireless terminal device 20 registered in advance. The registered terminal ID storage unit 517 may be implemented with the ROM 233 included in the wireless module 100 illustrated in FIG. 2, or by executing a program using the SoC 231.

The controller (control unit) 110 transitions from the low-power mode to the normal operating mode when the controller 110 being in the low-power mode receives return request signal output from the wireless module 100, and controls the image forming apparatus 10 for image forming function. The controller 110 may be implemented with hardware included in the controller 110 illustrated in FIG. 2 and FIG. 3, or by executing a program using the CPU 111 illustrated in FIG. 2 and FIG. 3.

The controller 110 includes a mode control unit 521, a communication control unit 522, a display control unit 523, an operation receiving unit 524, and an image forming control unit.

The mode control unit 521 causes the image forming apparatus 10 to transition between the normal operating mode (first power mode) in which the image forming function can be performed and the low-power mode (second power mode) in which the power consumption is less than that in the normal operating mode. The mode control unit 521 may be implemented with the power mode control unit 223 illustrated in FIG. 2 and FIG. 3 or the power mode control device 301 illustrated in FIG. 3, or by executing a program using the CPU 111.

Additionally, the low-power mode may include one ore more low-power modes (e.g. a sleep mode and a deep sleep mode).

The mode control unit 521 causes the image forming apparatus 10 being in any one of the one or more low-power modes to transition to the normal operating mode in response to the reception of the return request signal output from the wireless module 100.

The communication control unit 522 causes the wireless module 100 to establish the BLE communication connection and transmits and receives the data. The communication control unit 522 may be implemented by executing a program using the CPU 111.

The display control unit 523 displays, for example, an operation screen in relation to the operation of the image forming apparatus 10 on the operation device 114. The display control unit 523 may be implemented by executing a program using CPU 111.

The operation receiving unit 524 receives, for example, input operation to the operation device 114 of the image forming apparatus 10 by a user. The operation receiving unit 524 may be implemented by executing a program using CPU 111.

The image forming control unit 525 controls the scanner device 120, the input data control unit 217, the image processing unit 218, the output data control unit 219, the engine device 130, the FAX I/F 220, and the FCU 140, which are illustrated in FIG. 2, for the image forming processing. The image forming control unit 525 may be implemented by executing a program using the CPU 111.

Configuration of Wireless Terminal Device

The wireless terminal device (external device) 20 includes a notification signal receiving unit 531, a connection request signal transmitting unit 532, an additional information acquisition unit 533, a data transmitting and receiving unit 534, a communication control unit 535, a registered apparatus ID storage unit 536, and a display input control unit 537.

The notification signal receiving unit 531 receives a predetermined notification signal, such as the advertisement packet for the BLE communication, transmitted from the image forming apparatus 10 with the short-range wireless communication I/F, illustrated in FIG. 4. The notification signal receiving unit 531 may be implemented with the short-range wireless communication I/F illustrated in FIG. 4, or by executing a program using the CPU 401 illustrated in FIG. 4.

The connection request signal transmitting unit 532 transmits a connection request (CONNECT_REQ) for the BLE communication connection to the image forming apparatus 10 that previously sends the predetermined notification signal such as the advertisement packet with the short-range communication I/F illustrated in FIG. 4. The connection request signal transmitting unit 532 may be implemented with the short-range wireless communication I/F, or by executing a program with the CPU 401 illustrated in FIG. 4.

Preferably, the connection request signal transmitting unit 532 sends the connection request signal to the image forming apparatus 10 when the notification signal, the advertisement packet received with the notification signal receiving unit 531 includes the same apparatus ID as that stored in the registered apparatus ID storage unit 536 in advance.

The additional information acquisition unit 533 sends a scan request (SCAN_REQ) to request the additional information to the image forming apparatus 10 that previously sends the predetermined notification signal, the advertisement packet, using the short-range wireless communication I/F illustrated in FIG. 4. For example, the additional information acquisition unit 533 sends the scan request (SCAN_REQ) to the image forming apparatus 10 when the received advertisement packet includes a part of the apparatus ID of the image forming apparatus 10. The additional information acquisition unit 533 may be implemented with the short-range wireless communication I/F, or by executing a program with the CPU 401 illustrated in FIG. 4.

The data transmitting and receiving unit 534 transmits and receives a data packet using the short-range wireless communication I/F illustrated in FIG. 4. The data transmitting and receiving unit 534 may be implemented with the short-range wireless communication I/F, or by executing a program with the CPU 401 illustrated in FIG. 4.

The communication control unit 535 establishes and disconnects a short range wireless communication connection, such as the BLE communication connection with and from the image forming apparatus 10 using the short range wireless communication I/F illustrated in FIG. 4. The communication control unit 535 is implemented, for example, by executing a program with the CPU 401 illustrated in FIG. 4.

The registered apparatus ID storage unit 536 stores the apparatus ID of the image forming apparatus 10 that is registered in advance, as illustrated in FIG. 5D. The registered apparatus ID storage unit 536 may be implemented with the storage device 404 illustrated in FIG. 4, or by executing a program with the CPU 401 illustrated in FIG. 4.

The display input control unit 537 displays an operation screen on the display device 408 of the wireless terminal device 20 and receives input operation with the input device 407. The display input control unit 537 may be implemented by executing a program with the CPU 401 illustrated in FIG. 4.

Processing Flow

Next, a process of controlling the power mode with the above-described information processing system 1 and the image forming apparatus 10 is described below.

First Embodiment

Processing of Wireless Module

FIG. 6 is a flowchart illustrating a process performed by the wireless module 100 according to a first embodiment. The process illustrated in FIG. 6 is one example of processing that is performed by the wireless module 100 when the image forming apparatus 10 is in the low-power mode.

In S601, the notification signal transmitting unit 511 of the wireless module 100 transmits the advertisement packet (notification signal) for the BLE communication when the image forming apparatus 10 is in the low-power mode.

In S602, the connection request signal receiving unit 512 of the wireless module 100 determines whether or not the connection request (connection request signal) is received from the wireless terminal device 20 within a predetermined time after the notification signal transmitting unit 511 sends the advertisement packet.

If the wireless module 100 does not receive the connection request from the wireless terminal device 20 within the predetermined time, the process returns to S601 and the wireless module 100 sends the advertisement packet again.

By contrast, if the wireless module 100 receives the connection request from the wireless terminal device 20 within the predetermined time, the process continues to S603.

In S603, the return request signal output unit 515 of the wireless module 100 outputs the return request signal to the controller 110. As one example of the return request signal, the return request signal output unit 515 asserts a signal (e.g. interruption signal) to cause the controller 110 to return from the low-power mode.

In S604, the data transmitting and receiving unit 514 of the wireless module 100 establishes the BLE communication connection under control of the controller 110. The BLE communication connection between the image forming apparatus 10 and the wireless terminal device 20 allows a BLE data packet to be transferred between the image forming apparatus 10 and the wireless terminal device 20.

Processing of Information Processing System

Figure 7:
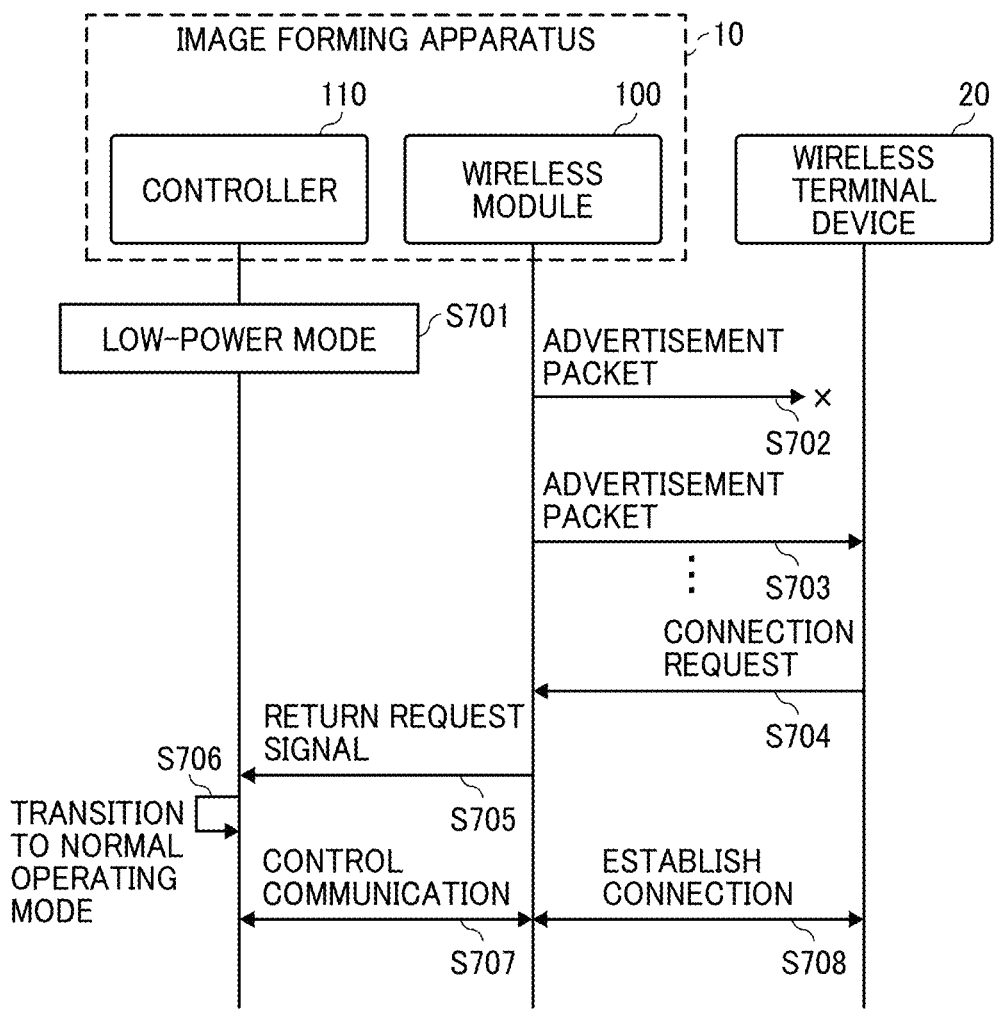
FIG. 7 is a sequence diagram illustrating an example of an information processing system according to a first embodiment.

FIG. 7 is a sequence diagram illustrating an example of a processing of the information processing system 1 according to the first embodiment.

In S701, the image forming apparatus 10 is in the low-power mode.

In the low-power mode, the controller 110 stops supplying power, for example, to the scanner device 120, the engine device 130, the FCU 140, and the HDD 116, and only performs processing required by the CPU 111 (e.g., receiving the return request signal).

On the other hand, even in the low-power mode, the power is still supplied to the wireless module 100, and the wireless module 100 can send the advertisement packet for the BLE communication and receive the connection request.

In S702, the wireless module 100 of the image forming apparatus 10 sends the advertisement packet at predetermined intervals when the image forming apparatus 10 is in the low-power mode.

In S703, when, for example, the wireless terminal device 20 comes within the effective wireless communication range 40 of the image forming apparatus 10 in FIG. 1, the advertisement packet is received by the wireless terminal device 20.

In S704, when the wireless terminal device 20 receives the advertisement packet with the notification signal receiving unit 531, the connection request signal transmitting unit 532 of the wireless terminal device 20 sends the connection request to the wireless module 100, which is the source of the advertisement packet.

In S705, the wireless module 100 receives the connection request sent from the wireless terminal device 20 with the connection request signal receiving unit 512, and sends the return request signal to request the controller 110 to return to the normal operating mode with the return request signal output unit 515.

In S706, the mode control unit 521 of the controller 110 causes the image forming apparatus 10 (controller 110) to transition from the low-power mode to the normal operating mode. For example, the mode control unit 521 restarts to supply the power to the scanner device 120, the engine device 130, the FCU 140, the HDD 116, etc., and performs a setting processing, if necessary.

In S707 and S708, the communication control unit 522 of the controller 110 controls the data transmitting and receiving unit 514 of the wireless module 100 and establish the BLE communication connection with the wireless terminal device 20. This allows the image forming apparatus 10 and the wireless terminal device 20 to transfer the BLE data packet therebetween via the BLE communication.

With the above-mentioned processing, the image forming apparatus (electronic apparatus) 10, which transitions from the low-power mode to the normal operating mode using the wireless module 100, can return to the normal operating mode without depending on a specific packet, application, or the like.

Second Embodiment

Processing of Wireless Module

Figure 8:
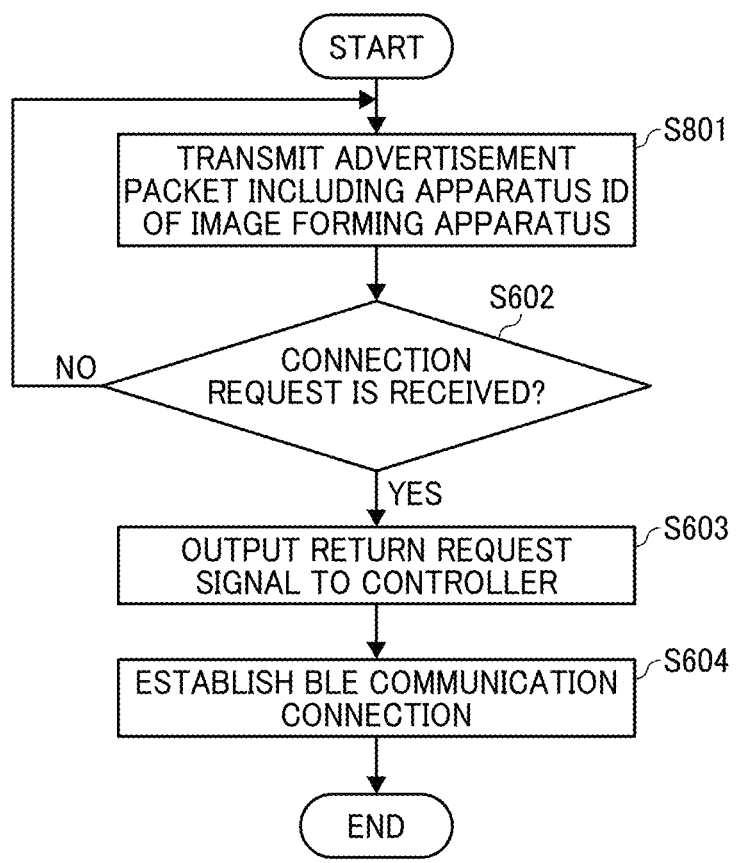
FIG. 8 is a flowchart illustrating an example process performed by a wireless module according to a second embodiment.

FIG. 8 is a flowchart illustrating an example of a process performed by the wireless module 100 according to a second embodiment. The process from S602 to S604 in FIG. 8 is the same as the process, S602 to S604 in FIG. 6, of the wireless module 100 according to the first embodiment. Accordingly, the following description concentrates on differences in the process between the first embodiment and the second embodiment.

In S801, the notification signal transmitting unit 511 of the wireless module 100 sends an advertisement packet including an apparatus ID of the image forming apparatus 10 that is stored in the apparatus ID storage unit 516 in advance when the image forming apparatus 10 is in the low-power mode.

Processing of Information Processing System

Figure 9:
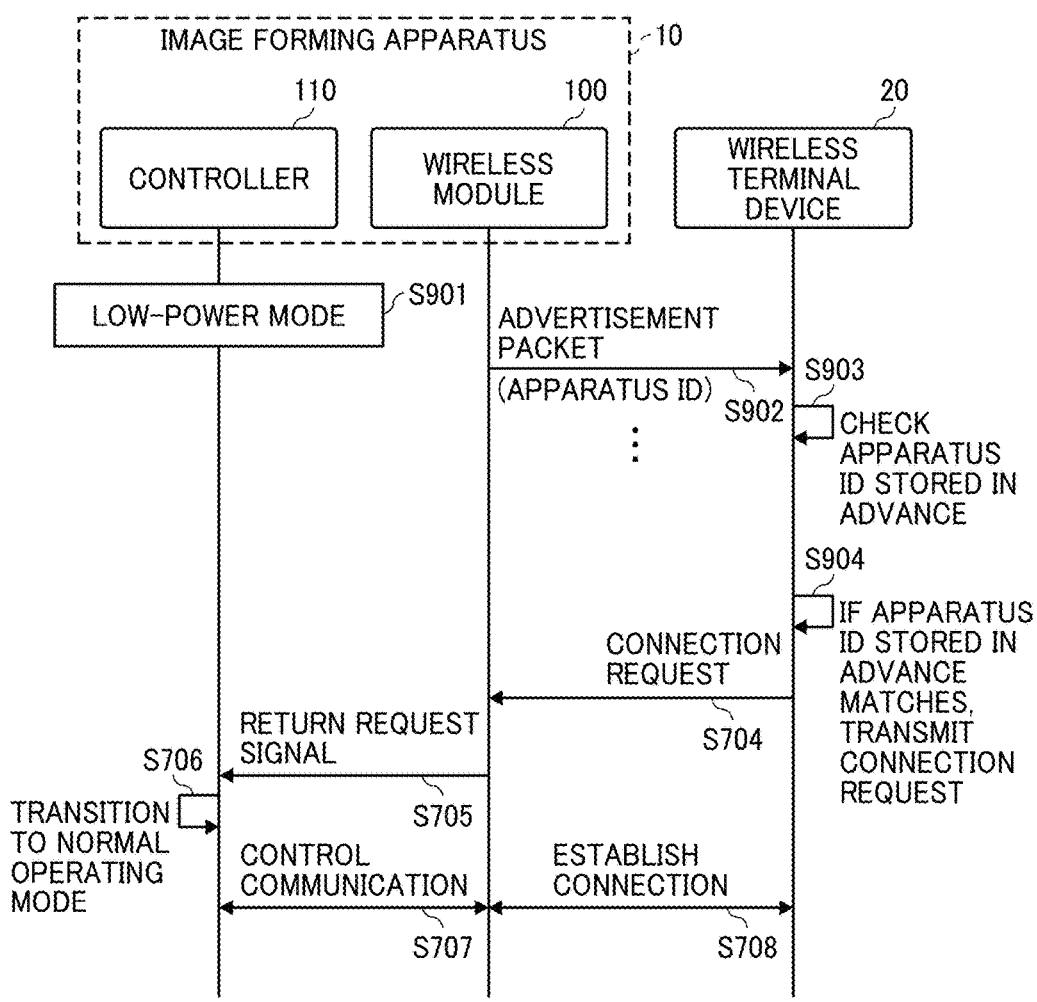
FIG. 9 is a sequence diagram illustrating an example of an information processing system according to a second embodiment.

FIG. 9 is a sequence diagram illustrating processing of the information processing system 1 according to the second embodiment. The process from S704 to S708 in FIG. 9 is the same as the process illustrated in FIG. 7, so that differences between the second embodiment and the first embodiment are described below.

In S901, the image forming apparatus 10 is in the low-power mode.

In S902, the wireless module 100 of the image forming apparatus 10 is in the low-power mode and transmits the advertisement packet including the apparatus ID of the image forming apparatus 10 at predetermined intervals.

The wireless module 100 according to this embodiment stores the apparatus ID, which is the identification information to identify the image forming apparatus 10, in the apparatus ID storage unit 516.

In S903, when receiving the advertisement packet with the notification signal receiving unit 531, the wireless terminal device 20 compares the apparatus ID included in the advertisement packet with an apparatus ID stored in the connection request signal transmitting unit 532 in advance.

Here, the wireless terminal device 20 according to this embodiment registers one or more apparatus IDs in the registered apparatus ID storage unit 536 in advance.

In S904, the connection request signal transmitting unit 532 of the wireless terminal device 20 transmits the connection request to the wireless module 100 when the apparatus ID included in the advertisement packet match one of the apparatus IDs stored in the registered apparatus ID storage unit 536 in advance.

On the other hand, when the apparatus ID included in the advertisement packet does not match any one of the apparatus IDs stored in the registered apparatus ID storage unit 536, the connection request signal transmitting unit 532 of the wireless terminal device 20 does not transmit the connection request.

With the processing described above, the wireless terminal device 20 can selectively transmit the connection request to the image forming apparatus 10 that is previously registered, even when receiving multiple advertisement packets transmitted from a plurality of the image forming apparatuses 10.

Third Embodiment

Processing of Wireless Module

Figure 10:
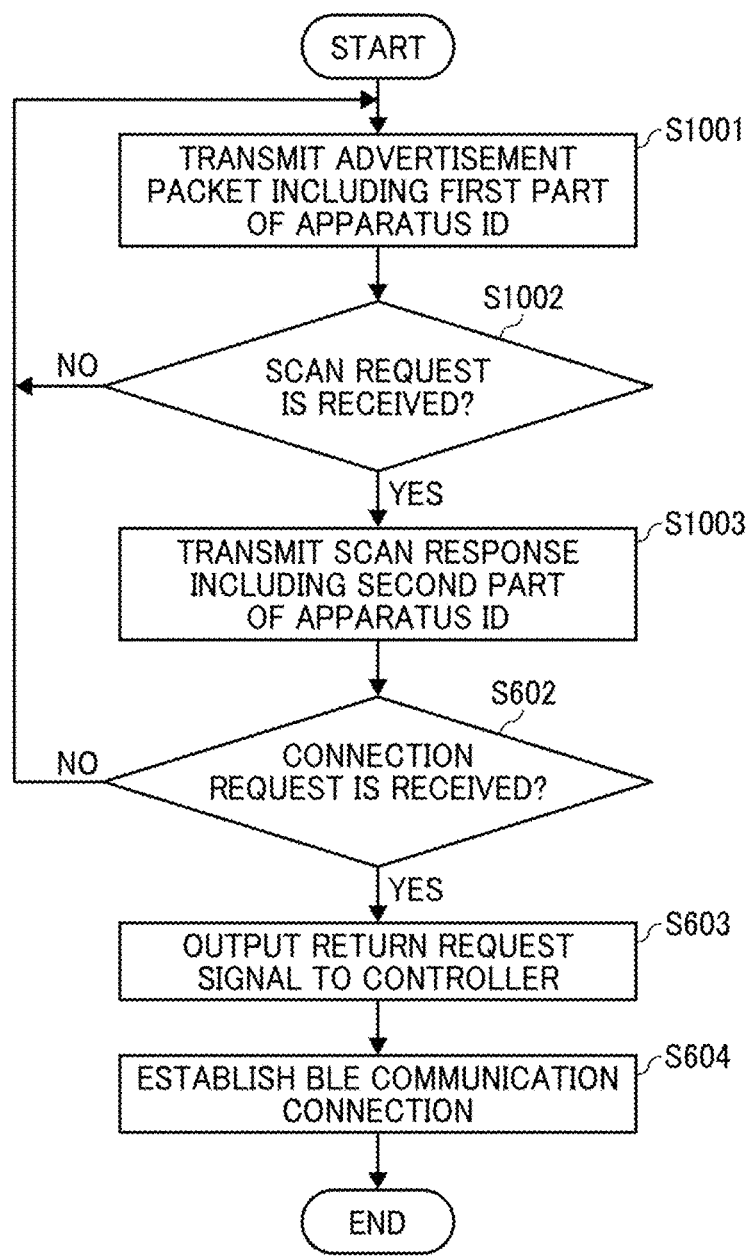
FIG. 10 is a flowchart illustrating an example process performed by a wireless module according to a third embodiment.

FIG. 10 is a flowchart illustrating a process performed by the wireless module 100 according to a third embodiment. The process from S602 to S604 in FIG. 10 is the same as the process of the wireless module 100 according to the first embodiment illustrated in FIG. 6, so that differences between the third embodiment and the first embodiment are described below.

In S1001, the notification signal transmitting unit 511 of the wireless module 100 transmits an advertisement packet (notification signal) for the BLE communication including a part (first part) of an apparatus ID of the image forming apparatus 10 when the image forming apparatus 10 is in the low-power mode.

This situation may arise because there is a limit to the size of the data that can be transmitted by advertisement packet (e.g., 31 bytes), so that when the size of the apparatus ID data is large the apparatus ID does not fit in the advertisement packet.

In S1002, the wireless module 100 determines whether the additional information providing unit 513 receives the scan request to send additional information, from the wireless terminal device 20.

When the scan request is not received, the process continues to S1001, and the wireless module 100 transmits the advertisement packet again.

On the other hand, when the scan request is received, the wireless module 100 continues to S1003.

In S1003, the additional information providing unit 513 of the wireless module 100 transmits to the wireless terminal device 20 a scan response including the other part (a second part) of the apparatus ID of the image forming apparatus 10, without the part (first part) of apparatus ID that is sent in S1001.

Alternatively, as another example, if all of the apparatus ID of the image forming apparatus 10 can be included in a scan response packet, the additional information providing unit 513 may transmit the scan response including all of the apparatus ID to the wireless terminal device 20.

Processing of Information Processing System

Figure 11:
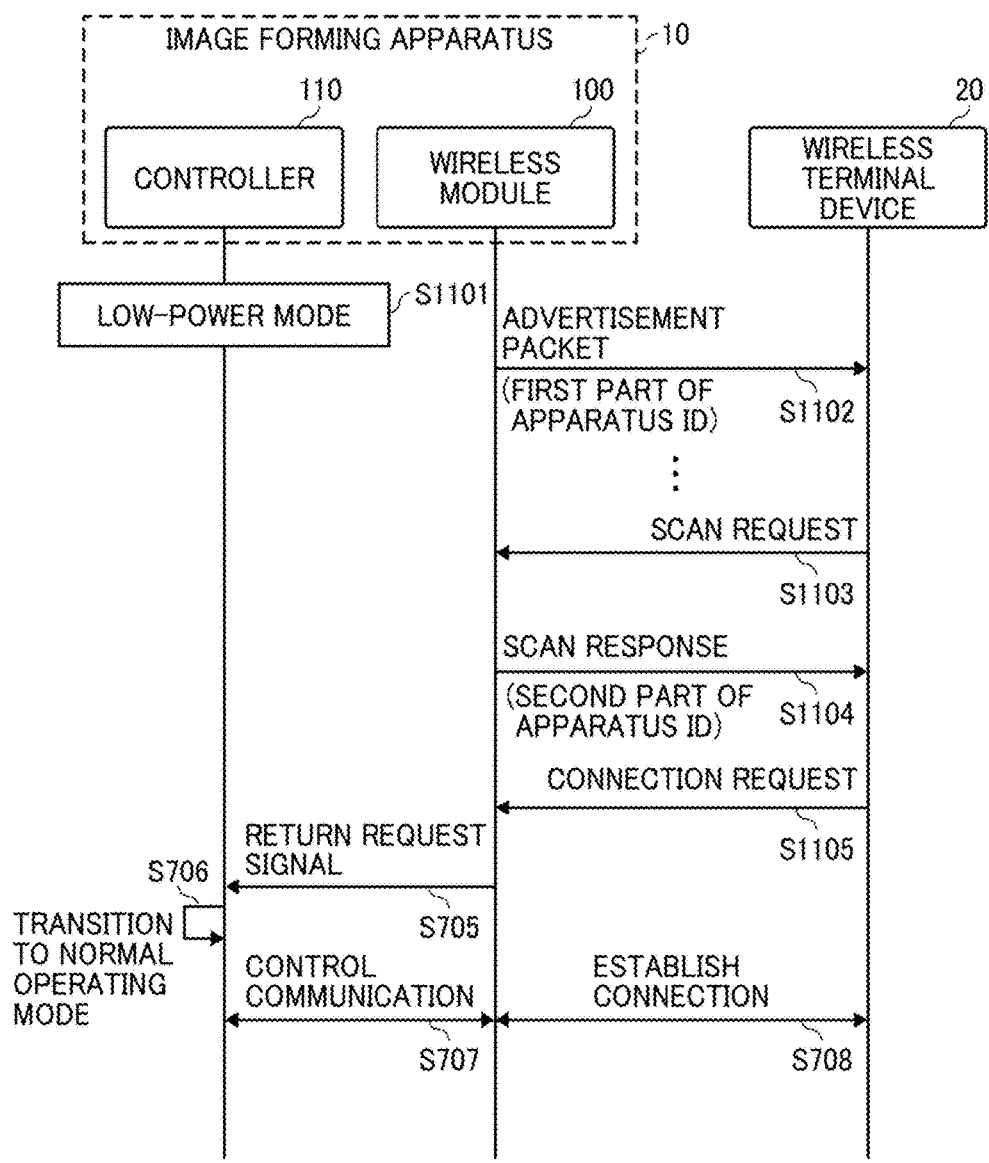
FIG. 11 is a sequence diagram illustrating an example of an information processing system according to a third embodiment.

FIG. 11 is a sequence diagram illustrating an example of processing of the information processing system 1 according to the third embodiment. The process from S705 to S708 in FIG. 11 is the same as the process of the information processing system according to the first embodiment illustrated in FIG. 7, so that differences between the third embodiment and the first embodiment are described below.

In S1101, the image forming apparatus 10 is in the low-power mode.

In S1102, the wireless module 100 of the image forming apparatus 10 is in the low-power mode, and transmits an advertisement packet including the part (first part) of the apparatus ID of the image forming apparatus 10 at predetermined intervals.

In this embodiment, the advertisement packet transmitted from the wireless module 100 includes information indicating that the advertisement packet can be scanned.

In S1103, the wireless terminal device 20 sends the scan request to the wireless module 100 using the additional information acquisition unit 533 when receiving the advertisement packet with the notification signal receiving unit 531.

In S1104, the additional information providing unit 513 of the wireless module 100 sends to the wireless terminal device 20 the scan response including the other part (second part) of the apparatus ID of the image forming apparatus 10 in response to the reception of the scan request.

In S704, the connection request signal transmitting unit 532 of the wireless terminal device 20 combines the first part of the apparatus ID received at S1102 and the second part of the apparatus ID received at S1104 to specify the apparatus ID, and sends the connection request to the wireless module 100.

With the process described above, the wireless terminal device 20 can identify the image forming apparatus 10 even when the number of the apparatus IDs is large, that is, for example, the number of the image forming apparatuses 10 to be selected is large.

Fourth Embodiment

Processing of Wireless Module

Figure 12:
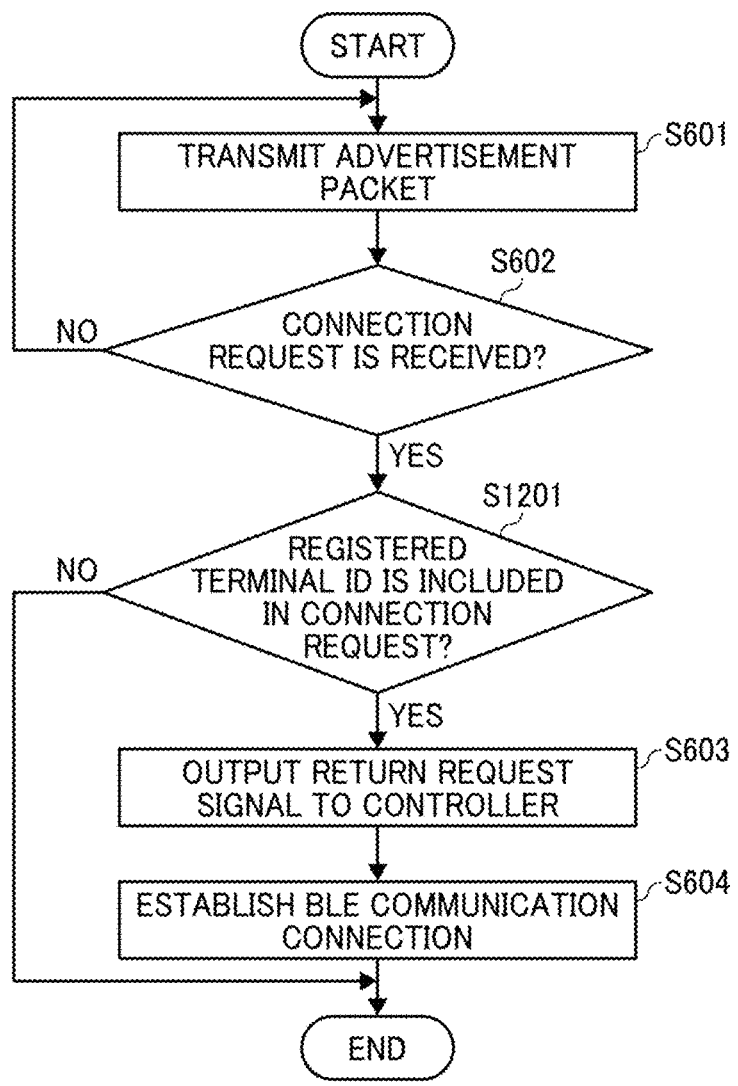
FIG. 12 is a flowchart illustrating an example process performed by a wireless module according to a fourth embodiment.

FIG. 12 is a flowchart illustrating an example of processing of the wireless module 100 according to a fourth embodiment.

The process S601, S602, S603, and S604 in FIG. 12 is the same as the process of the wireless module according to the first embodiment illustrated in FIG. 6, so that differences between the first embodiment and the fourth embodiment are described below.

The wireless module 100 according to this embodiment stores one or more terminal IDs that are identification information to identify one or more wireless terminal devices 20 that are registered in the registered terminal ID storage unit 517 in advance.

In S1201, the return request signal output unit 515 of the wireless module 100 determines whether a connection request received with the connection request signal receiving unit 512 includes a terminal ID that is same as stored in the registered terminal ID storage unit 517 in advance.

When the connection request received with the connection request signal receiving unit 512 does not include the terminal ID stored in the registered terminal ID storage unit 517 in advance, the return request signal output unit 515 ends the process.

By contrast, when the connection request received with the connection request signal receiving unit 512 includes the terminal ID stored in the registered terminal ID storage unit 517 in advance, the return request signal output unit 515 continues the process to S603.

Processing of Information Processing System

Figure 13:
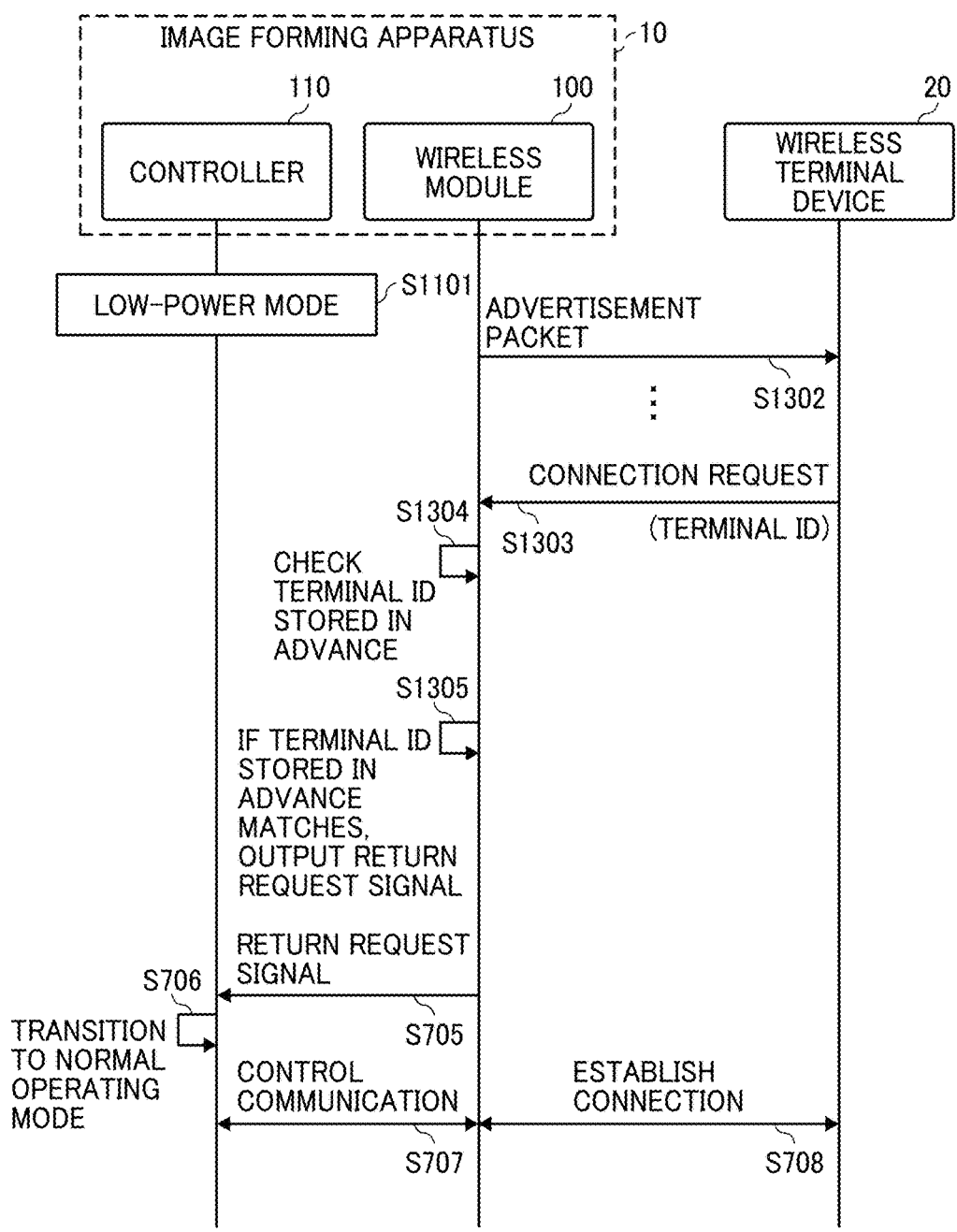
FIG. 13 is a sequence diagram illustrating an example of an information processing system according to a fourth embodiment.

FIG. 13 is a sequence diagram illustrating processing of an information processing system 1 according to the fourth embodiment. The processing from S705 to S708 in FIG. 13 is the same as the processing from S705 to S708 of the information processing system 1 according to the first embodiment illustrated in FIG. 7, so that differences between the fourth embodiment and the first embodiment are described in below.

In S1301, the image forming apparatus 10 is in the low-power mode.

In S1302, the wireless module 100 of the image forming apparatus 10 transmits an advertisement packet for the BLE communication at predetermined intervals when the image forming apparatus 10 is in the low-power mode.

In S1303, when receiving the advertisement packet with the notification signal receiving unit 531, the wireless terminal device 20 sends the connection request including the terminal ID of the wireless terminal device 20 to the wireless module 100 with the connection request signal transmitting unit 532.

In S1304, the return request signal output unit 515 of the wireless module 100 compares the terminal ID included in the connection request received with the connection request signal receiving unit 512 and the terminal IDs stored in the registered terminal ID storage unit 517 in advance.

In S1305, the return request signal output unit 515 of the wireless module 100 processes S705 and outputs the return request signal when the terminal ID included in the connection request matches one of terminal IDs stored in the registered terminal ID storage unit 517 in advance.

On the other hand, when the terminal ID included in the connection request does not match any one of the terminal IDs stored in the registered terminal ID storage unit 517 in advance, the return request signal output unit 515 stops outputting.

With the processing described above, the wireless module 100 outputs the return request signal to the controller 110 when receiving the connection request signal from the wireless terminal device 20 that is registered in advance.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the exemplary embodiments of the disclosure have been described and illustrated above, such description is not intended that the disclosure be limited to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An electronic apparatus configured to operate in a first power mode and a second power mode, the electronic apparatus comprising:
   circuitry configured to transition the electronic apparatus from the second power mode to the first power mode, in response to a return request signal, the first power mode being a mode in which the electronic apparatus performs functions, and the second power mode being a mode in which the electronic apparatus consumes less power than that of the first power mode; and
   a wireless communication device configured to:
      transmit, via a first interface, a notification signal to an external device via a short-range wireless communication when the electronic apparatus is in the second power mode,
      receive, via the first interface, a connection request signal from the external device in response to the notification signal,
      output, via a second interface, the return request signal to the circuitry in response to the connection request signal such that the electronic apparatus transitions from the second power mode to the first power mode to resume performing the functions upon receipt of the return request signal from the wireless communication device, and
      establish a short-range wireless communication connection with the external device.

2. The electronic apparatus of claim 1, wherein the short-range wireless communication is Bluetooth Low Energy communication.

3. The electronic apparatus of claim 1, wherein the wireless communication device includes a first memory configured to store first identification information to identify the external device, and wherein
   the wireless communication device is configured to output the return request signal when the connection request signal received from the external device includes the first identification information identifying the external device.

4. The electronic apparatus of claim 1, wherein the wireless communication device includes a second memory configured to store second identification information to identify the electronic apparatus, and the wireless communication device is configured to transmit the notification signal to the external device such that the notification signal includes the second identification information identifying the electronic apparatus.

5. The electronic apparatus of claim 4, wherein the wireless communication device is configured to, transmit the notification signal including a first part of the second identification information identifying the electronic apparatus, and transmit additional information including a second part of the second identification information identifying the electronic apparatus other than the first part in response to receiving a request signal for the additional information from the external device.

6. The electronic apparatus of claim 1, wherein the functions of the electronic apparatus are image forming functions, and the electronic apparatus further comprises:

an operation device configured to receive user input; and a main body configured to perform the image forming functions according to the user input.

7. The electronic apparatus of claim 6, wherein the circuitry is in the main body.

8. The electronic apparatus of claim 6, wherein the circuitry is in the operation device.

9. The electronic apparatus of claim 1, wherein the wireless communication device includes the first interface configured to communicate with the external device via the short-range wireless communication connection and the first interface configured to communicate with the electronic apparatus such that the electronic apparatus is configured to receive the return request signal from the wireless communication device via the first interface of the wireless communication device.

10. The electronic apparatus of claim 1, wherein the electronic apparatus is configured to restart supplying power to one or more of a scanner drive, a print engine device, and a facsimile controller in response to the return request signal.

11. The electronic apparatus of claim 1 wherein the wireless communication device is configured to establish a short-range wireless communication connection with the external device after outputting, via the second interface, the return request signal to the circuitry.

12. A wireless communication device configured to connect to an electronic apparatus, the electronic apparatus configured to transition between a first power mode and a second power mode, the wireless communication device comprising:

memory and processing circuitry, the processing circuitry configured to, transmit, via a first interface, a notification signal to an external device via a short-range wireless communication when the electronic apparatus is in the second power mode, the second power mode being a mode in which the electronic apparatus consumes less power than that of the first power mode, receive, via the first interface, a connection request signal from the external device in response to the notification signal, output, via a second interface, a return request signal to the electronic apparatus in response to the connection request signal to cause the electronic apparatus to transition from the second power mode to the first power mode to resume performing functions in the first power mode upon receipt of the return request signal from the wireless communication device, and establish a short-range wireless communication connection with the external device.

13. A system, comprising:

the wireless communication device of claim 12; and the electronic apparatus connected to the wireless communication device.

14. The wireless communication device of claim 12, wherein the wireless communication device includes the first interface configured to communicate with the external device via the short-range wireless communication connection and the first interface configured to communicate with the electronic apparatus such that the electronic apparatus is configured to receive the return request signal from the wireless communication device via the first interface of the wireless communication device.

15. The wireless communication device of claim 12, wherein the wireless communication device is configured to instruct the electronic apparatus to restart supplying power to one or more of a scanner drive, a print engine device, and a facsimile controller in response to the return request signal.

16. A method of managing power mode of an electronic apparatus by a wireless communication device, the electronic apparatus configured to transition between a first power mode and a second power mode, the method comprising:

transmitting, via a first interface, a notification signal to an external device via a short-range wireless communication when the electronic apparatus is in the second power mode, the second power mode being a mode in which the electronic apparatus consumes less power than that of the first power mode;

receiving, via the first interface, a connection request signal from the external device in response to the notification signal;

outputting, via second interface, a return request signal to cause the electronic apparatus in response to the connection request signal to cause the electronic apparatus to transition from the second power mode to the first power mode to resume performing functions in the first power mode upon receipt of the return request signal; and establishing a short-range wireless communication connection with the external device.

17. The method of claim 16, the wireless communication device includes the first interface configured to communicate with the external device via the short-range wireless communication connection and the first interface configured to communicate with the electronic apparatus such that the electronic apparatus is configured to receive the return request signal from the wireless communication device via the first interface of the wireless communication device.

18. The method of claim 16, wherein the outputting the return request signal includes instructing the electronic apparatus to restart supplying power to one or more of a scanner drive, a print engine device, and a facsimile controller in response to the return request signal.

\* \* \* \* \*